US012336514B2

(12) United States Patent
Messana et al.

(10) Patent No.: US 12,336,514 B2
(45) Date of Patent: *Jun. 24, 2025

(54) SENSOR POSITIONING SYSTEM

(71) Applicant: TidalX AI Inc., San Ramon, CA (US)

(72) Inventors: Matthew Messana, Sunnyvale, CA (US); Kyle James Cormany, Atascadero, CA (US); Christopher Thornton, Vancouver (CA); Barnaby John James, Campbell, CA (US); Neil Davé, San Mateo, CA (US); Shane Washburn, Oakland, CA (US)

(73) Assignee: TidalX AI Inc., Mountain View, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 18/149,840

(22) Filed: Jan. 4, 2023

(65) Prior Publication Data
US 2023/0157262 A1 May 25, 2023

Related U.S. Application Data

(60) Continuation of application No. 17/706,862, filed on Mar. 29, 2022, which is a division of application No.
(Continued)

(51) Int. Cl.
*A01K 61/10* (2017.01)
*A01K 61/65* (2017.01)
(Continued)

(52) U.S. Cl.
CPC .............. *A01K 61/10* (2017.01); *A01K 61/65* (2017.01); *A01K 61/85* (2017.01); *B25J 13/085* (2013.01);
(Continued)

(58) Field of Classification Search
CPC ......... A01K 61/10; A01K 61/85; A01K 61/65
See application file for complete search history.

(56) References Cited

U.S. PATENT DOCUMENTS

| 4,495,891 A | 1/1985 | Dugan et al. |
| 6,262,761 B1 | 7/2001 | Zernov et al. |

(Continued)

FOREIGN PATENT DOCUMENTS

| CA | 2020618 | 1/1991 |
| CA | 2455384 | 8/2013 |

(Continued)

OTHER PUBLICATIONS

Office Action in Chilean Patent Appn. 202201971, dated Nov. 27, 2023, 7 pages (with English translation).

(Continued)

*Primary Examiner* — Clayton E. LaBalle
*Assistant Examiner* — Diana Hancock
(74) *Attorney, Agent, or Firm* — Fish & Richardson P.C.

(57) ABSTRACT

A sensor positioning system, includes an actuation server for communicating with components of the sensor positioning system. The sensor positioning system additionally includes a first actuation system and a second actuation system, wherein each actuation system includes a pulley system for maneuvering an underwater sensor system. The sensor positioning system includes a dual point attachment bracket that connects through a first line to the first actuation system and connecting through a second line to the second actuation system. The underwater sensor system is affixed to the first pulley system, the second pulley system, and the dual attachment bracket through the first line and the second line.

10 Claims, 4 Drawing Sheets

Related U.S. Application Data

16/385,292, filed on Apr. 16, 2019, now Pat. No. 11,659,819.

(60) Provisional application No. 62/742,145, filed on Oct. 5, 2018.

(51) Int. Cl.
*A01K 61/85* (2017.01)
*B25J 13/08* (2006.01)
*B25J 19/02* (2006.01)
*G03B 17/08* (2021.01)

(52) U.S. Cl.
CPC ........... *B25J 13/087* (2013.01); *B25J 13/089* (2013.01); *B25J 19/021* (2013.01); *G03B 17/08* (2013.01)

(56) References Cited

U.S. PATENT DOCUMENTS

| | | | |
|---|---|---|---|
| 8,167,506 B2 * | 5/2012 | Martos | G03B 15/00 396/427 |
| 10,064,396 B2 | 9/2018 | Lyngoy | |
| 10,856,520 B1 | 12/2020 | Kozachenok et al. | |
| 11,266,128 B2 | 3/2022 | Yao | |
| 11,659,819 B2 * | 5/2023 | Messana | A01K 61/80 396/25 |
| 2003/0000653 A1 | 1/2003 | Ulatowski et al. | |
| 2003/0163287 A1 | 8/2003 | Vock et al. | |
| 2004/0065873 A1 * | 4/2004 | Peterson | B66D 1/485 254/276 |
| 2006/0112898 A1 | 6/2006 | Fjelstad et al. | |
| 2010/0198023 A1 | 8/2010 | Yanai et al. | |
| 2015/0096277 A1 | 4/2015 | Muffie | |
| 2015/0302241 A1 | 10/2015 | Eineren et al. | |
| 2016/0378981 A1 | 12/2016 | Cutler et al. | |
| 2017/0150701 A1 | 6/2017 | Gilmore et al. | |
| 2018/0132459 A1 | 5/2018 | Baba | |
| 2019/0228218 A1 | 7/2019 | Barnaby et al. | |
| 2019/0300135 A1 * | 10/2019 | Troy | G03B 17/48 |
| 2019/0335720 A1 | 11/2019 | Kim | |
| 2019/0340440 A1 | 11/2019 | Atwater et al. | |
| 2020/0113158 A1 | 4/2020 | Rishi | |
| 2020/0155882 A1 | 5/2020 | Tohidi et al. | |
| 2020/0288678 A1 | 9/2020 | Howe et al. | |

FOREIGN PATENT DOCUMENTS

| | | |
|---|---|---|
| CH | 709805 | 12/2015 |
| CL | 201501722 | 5/2016 |
| CL | 2019000039 A1 | 3/2019 |
| CN | 101403910 | 4/2009 |
| CN | 102037909 | 5/2011 |
| CN | 102630599 | 8/2012 |
| CN | 103766259 | 5/2014 |
| CN | 204518877 | 8/2015 |
| CN | 106135070 | 11/2016 |
| CN | 106538448 | 3/2017 |
| CN | 107549036 | 1/2018 |
| CN | 107633221 | 1/2018 |
| CN | 107950427 | 4/2018 |
| CN | 108029608 | 5/2018 |
| CN | 108040948 | 5/2018 |
| CN | 108450357 | 8/2018 |
| CN | 208624391 | 3/2019 |
| DE | 102016118555 | 3/2018 |
| EP | 1186231 | 3/2002 |
| EP | 2244934 | 11/2010 |
| EP | 3484283 | 5/2019 |
| FR | 1576220 | 7/1969 |
| GB | 8702439 | 3/1987 |
| JP | 3004788 | 9/1994 |
| JP | 2002171853 | 6/2002 |
| JP | 2004000086 | 1/2004 |
| KR | 19990039914 | 6/1999 |
| KR | 20120087212 | 8/2012 |
| NO | 300401 | 5/1997 |
| NO | 300401 B1 * | 5/1997 |
| NO | 332103 | 6/2012 |
| NO | 20160199 | 8/2017 |
| NO | 20160880 | 11/2017 |
| RU | 2015145517 | 4/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO2012081990 | 6/2012 |
| WO | WO 2014/098614 | 6/2014 |
| WO | WO 2014/179482 | 11/2014 |
| WO | WO 2016/023071 | 2/2016 |
| WO | WO 2016/063033 | 4/2016 |
| WO | WO2017137896 | 8/2017 |
| WO | WO 2017/153417 | 9/2017 |
| WO | WO 2018/011744 | 1/2018 |
| WO | WO2018011745 | 1/2018 |
| WO | WO 2018/117850 | 6/2018 |
| WO | WO 2019/002881 | 1/2019 |
| WO | WO 2019/121851 | 6/2019 |
| WO | WO 2019/168406 | 9/2019 |
| WO | WO 2019/188506 | 10/2019 |
| WO | WO 2019/212807 | 11/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

Akvagroup.com' [online], "Akvasmart cameras and winches," 2016, [retrieved on Apr. 16, 2019], retrieved from: URL<https://www.akvagroup.com/Products/User%20Manuals/Camera/UK%20User%20manual%20Akvasmart%20Camera%20with%20and%20without%20winch.pdf> 58 pages.

Decision to Grant Patent in Japanese Appln. No. 2021-514534, dated Nov. 4, 2022, 5 pages (with English translation).

Extended Search Report in European Appln. No. 22151132.2, dated May 2, 2022, 10 pages.

International Search Report and Written Opinion in International Appln No. PCT/US2022/018651, dated Jun. 22, 2022, 14 pages.

International Search Report and Written Opinion in International Appln No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

International Search Report and Written Opinion in International Appln. No. PCT/US2020/059829, dated Feb. 25, 2021, 18 pages.

International Search Report and Written Opinion International Appln No. PCT/US2022/023831, dated Jul. 8, 2022, 13 pages.

Maloy et al., "A spatio-temporal recurrent network for salmon feeding action recognition from underwater videos in aquaculture," Computers and Electronics in Agriculture, Nov. 12, 2019, 9 pages.

Meidell et al., "FishNet: A Unified Embedding for Salmon Recognition," Thesis for Master's degree in Artificial Intelligence, Norwegian University of Science and Technology, Jun. 2019, 86 pages.

Moskvyak et al., "Robust Re-identification of Manta Rays from Natural Markings by Learning Pose Invariant Embeddings," CoRR, Feb. 2019, ar Xiv:1902.10847v1, 12 pages.

Odey, "AquaMesh—Design and Implementation of Smart Wireless Mesh Sensor Networks for Aquaculture," American Journal of Networks and Communications, Jul. 2013, 8 pages.

(56) References Cited

OTHER PUBLICATIONS

Office Action in Canadian Appln. No. 3,087,370, dated Aug. 4, 2021, 3 pages.
Office Action in Canadian Appln. No. 3,113,831, dated Jan. 20, 2023, 6 pages.
Office Action in Canadian Applu. No. 3,113,831, dated Jun. 13, 2022, 3 pages.
Office Action in Chilean Patent Appn. 202100828, dated Aug. 6, 2022, 19 pages (with English translation).
Office Action in Chilean Patent Appn. 202100828, dated Jun. 13, 2022, 24 pages (with English translation).
Office Action in Chinese Appln. No. 201980065862.3 dated Mar. 1, 2022, 33 pages (with English translation).
Office Action in Chinese Appln. No. 201980065862.3 dated Oct. 21, 2022, 24 pages (with English translation).
Office Action in Japanese Appln. No. 2021-514534, dated May 10, 2022, 8 pages (with English translation).
PCT International Preliminary Report on Patentability in International Appln No. PCT/US2019/053986, dated Apr. 15, 2021, 10 pages.
PCT International Preliminary Report on Patentability in International Appln No. PCT/US2020/059829, dated May 27, 2022, 10 pages.
PCT International Search Report and Written Opinion in International Appln No. PCT/US2019/053986, dated Jan. 2, 2020, 30 pages.
Petrov et al., "Overview of the application of computer vision technology in fish farming," E3S Web of Conferences, 2020, 175:02015.
Qiu et al., "Improving Transfer Learning and Squeeze-and-Excitation Networks for Small-Scale Fine-Grained Fish Image Classification," IEEE Access, Dec. 2018, 6(31):78503-78512.
Saberloon et al., "Application of Machine Vision Systems in Aquaculture with Emphasis on Fish: State-of-the-Art and Key Issues," Reviews in Aquaculture, Dec. 2017, 9:369-387.
Stein et al., "Consistent melanophore spot patterns allow long-term individual recognition of Atlantic salmon Salmo Salar," Journal of Fish Biology, Nov. 2017, 91(6):1699-1712.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Wang, "Robust tracking of fish schools using CNN for head identification," Multimedia Tools and Applications, Nov. 2017, 20 pages.
Office Action in Chinese Appln. No. 201980065862.3, dated Jun. 5, 2023, 28 pages (with English translation).
Office Action in Canadian Appln. No. 3,113,831, dated Sep. 14, 2023, 6 pages.
Office Action in Japanese Appln. No. 2022-198191, dated Jan. 24, 2024, 8 pages (with English translation).
Office Action in Chilean Patent Appn. 202201971, dated Sep. 5, 2023, 31 pages (with English translation).
Office Action in Chile Appln. No. 202201971, dated May 8, 2024, 23 pages (with English translation).

\* cited by examiner

SENSOR POSITIONING SYSTEM

CROSS REFERENCE TO RELATED APPLICATION

This application is a continuation of U.S. application Ser. No. 17/706,862, filed Mar. 29, 2022, which is a divisional of U.S. application Ser. No. 16/385,292, filed Apr. 16, 2019, which claims the benefit of U.S. Provisional Application No. 62/742,145, filed Oct. 5, 2018, the contents of which are incorporated by reference herein.

FIELD

This specification relates to aquaculture systems.

BACKGROUND

Aquaculture includes the farming of aquatic cargo, such as fish, crustaceans, aquatic plants, and other organisms. Aquaculture involves cultivating freshwater and saltwater populations under controlled environments, and can be contrasted with commercial fishing. In particular, farming of fish can involve raising of fish commercially in tanks, fish ponds, or ocean enclosures, usually for food.

SUMMARY

Open ocean aquaculture systems that cultivate the growth and harvest of fish may require monitoring of the fish. These aquaculture systems, typically include a submersible cage structure containing live fish and a sensor positioning system within the submersible cage structure that monitors the cultivation of fish growth over time. The sensor positioning system includes a sensor system, a winch actuation system with one or more pulley systems, a far side pulley, and lines to position the sensor system. However, these systems may be subject to torque and rotational effects from external forces, such as the sea's current and strong winds, which in response, can require a human to perform maintenance on the sensor positioning system. The human can reposition the location of the sensor system in the submersible cage structure and can fix one or more of the components of the sensor system that may have broken due to the external forces.

In some implementations, the submersible cage structure can be configured to include a sensor positioning system that resists the effects of external forces. By using dual bracing components in the sensor positioning system and a winch actuation system that allows for both translation and vertical depth positioning, the sensor positioning system becomes a stable hanger for sensor pointing while in the submersible cage. The dual bracing components are more efficient than typical bracing components because of its resistance to torqueing against the effects of external forces. Thus, the sensor positioning system can acquire sensor data, such as capturing media (e.g., images and video footage), thermal imaging, and heat signatures, to name a few examples, of aquatic cargo while positioned in the submersible cage in a stable manner without the need for user service.

One benefit of the sensor positioning system is its ability to limit the rotational disturbances caused by external forces. These external forces can be ocean current, strong winds, and fish movement colliding with the sensor positioning system. In addition to limiting the rotational disturbances caused by the external forces, the sensor positioning system can control its actual rotational movement in view of external forces. In particular, the sensor positioning system can rotate to a desired angle to view aquatic cargo in the submersible cage structure. The sensor positioning system can hold its position at the desired angle in the submersible cage structure in view of the external forces.

In one general aspect, a winch camera system, includes a winch actuation system for maneuvering an underwater camera system in more than one direction, wherein the winch actuation system includes a first pulley system and second pulley system. The winch camera system includes a dual point attachment bracket for supporting the underwater camera system and connecting to two winch ropes. The winch camera system includes a far side pulley affixed to the first pulley system and the dual point attachment bracket through a rope. The winch camera system includes the underwater camera system affixed to the second pulley system and the dual point attachment bracket through a rope. The winch camera system includes a panning motor coupled to the dual point attachment bracket, the panning motor being configured to adjust a rotational position of the underwater sensor system with respect to the dual point attachment bracket.

Implementations may include one or more of the following features. For example, the first pulley system is a spool and the second pulley system is a spool.

In some implementations, the winch actuation system is configured to receive instructions from an actuation server to rotate the first pulley system at a first rotational speed in a first direction and rotate the second pulley system at a second rotational speed in a second direction. The winch actuation system is configured to rotate the first pulley system at the first rotational speed in the first direction; and rotate the second pulley system at the second rotational speed in the second direction.

In some implementations, the first direction and the second direction include a clockwise direction or a counterclockwise direction.

In some implementations, the underwater camera system includes an imaging system for capturing media of aquatic life; one or more panning motors for controlling movement of the imaging system; a sensor module for recording the captured media of the aquatic life; and a frame for supporting of the components of the imaging system.

In some implementations, the winch actuation system is configured to move the underwater camera unit in a downward direction further including: rotate the first pulley system at a first rotational speed in a clockwise direction; and rotate the second pulley system at a second rotational speed in a counter-clockwise direction.

In some implementations, the winch actuation system is configured to move the underwater camera system in an upward direction further including: rotate the first pulley system at a first rotational speed in a counter-clockwise direction; and rotate the second pulley system at a second rotational speed in a clockwise direction.

In some implementations, the winch actuation system is configured to move the underwater camera system toward the far side pulley further including: rotate the first pulley system at a first rotational speed in a counter-clockwise direction; and rotate the second pulley system at a second rotational speed in a counter-clockwise direction.

In some implementations, the winch actuation system is configured to move the underwater camera system toward the winch actuation system further including: rotate the first pulley system at a first rotational speed in a clockwise direction; and rotate the second pulley system at a second rotational speed in a clockwise direction.

In some implementations, the underwater camera system further includes: the dual point attachment bracket with the two rope attachment providing stabilization to torques about a Y-axis and enabling the use of a panning motor to rotate and position the underwater camera unit about the Y-axis.

In some implementations, a sensor positioning system includes: a first actuation system for maneuvering an underwater sensor system in more than one direction, wherein the first actuation system includes a first pulley system; a second actuation system for maneuvering the underwater sensor system with the first actuation system in more than one direction, wherein the second actuation system comprises a second pulley system; a dual point attachment bracket for supporting the underwater sensor system, the dual attachment bracket connecting to the first actuation system through a first line and connecting the second actuation system through a second line; and the underwater sensor system affixed to the first pulley system, the second pulley system, and the dual point attachment bracket through the first line and the second line.

In some implementations, the first pulley system is a spool and the second pulley system is a spool.

In some implementations, the first pulley system is a pulley and the second pulley system is a pulley.

In some implementations, the sensor positioning system includes an actuation server configured to: determine a location of the underwater sensor system in a cage structure; determine a resultant distance in response to comparing the location of the underwater sensor system to a location of the edge of the cage structure; compare the resultant distance to a predetermined threshold; and in response to determining the resultant distance is within the predetermined threshold, transmit a first instruction to the first actuation system to reduce tension on the first line connected to the dual point attachment bracket; and transmit a second instruction to the second actuation system to reduce tension on the second line connected to the dual point attachment bracket.

In some implementations, the sensor positioning system includes an actuation server configured to: receive sensor data from the underwater sensor system that indicates detection of aquatic cargo movement in a cage structure; generate object recognition data of the aquatic cargo movement for tracking the aquatic cargo; and based on the generated object recognition data of the aquatic cargo movement: transmit a first instruction to the first actuation system to rotate the first pulley system at a first speed and a first direction to position the underwater sensor system to track the aquatic cargo; and transmit a second instruction to the second actuation system to rotate the second pulley system at a second speed and a second direction to position the underwater sensor system in conjunction with the first actuation system to track the aquatic cargo.

In some implementations, the sensor data includes media data from one or cameras and sensor data on the underwater sensor system.

In some implementations, the aquatic cargo includes one or more different types of fish.

In some implementations, the sensor positioning system includes an actuation server configured to: receive sensor data from the underwater sensor system that illustrates aquatic cargo viewed from the underwater sensor system; generate object recognition data from the sensor data that indicates a distance of the underwater sensor system to the aquatic cargo; based on the generated objection data from the sensor data that indicates the distance of the underwater sensor system to the aquatic cargo, transmit a first instruction to the first actuation system to rotate the first pulley system at a first speed and a first direction to position the underwater sensor system closer to the aquatic cargo; and transmit a second instruction to the second actuation system to rotate the second pulley system at a second speed and a second direction to position the underwater sensor system in conjunction with the first actuation system closer to the aquatic cargo.

In some implementations, based on the generated objection data from the sensor data that indicates the distance of the underwater sensor system to the aquatic cargo, the winch sensor system is further configured to: transmit a third instruction to the first actuation system to rotate the first pulley system at a first speed and a first direction to position the underwater sensor system farther away from the aquatic cargo; and transmit a fourth instruction to the second actuation system to rotate the second pulley system at a second speed and a second direction to position the underwater sensor system in conjunction with the first actuation system farther away from the aquatic cargo.

In some implementations, the winch sensor system positions the underwater sensor system in a cage structure based on a set schedule.

In some implementations, the method further includes a feeding mechanism for feeding food to fish in a cage structure, wherein the set schedule is based on a set schedule for the feeding of the food to the fish.

In some implementations, a method performed by one or more processing devices includes: receiving, by the one or more processing devices, data indicating parameters of a movable underwater sensor system in an aquatic structure; obtaining, by the one or more processing devices, data indicating (i) a position for the underwater sensor system in the aquatic structure and (ii) a measurement to be performed at the indicated position; causing, by the one or more processing devices, the underwater sensor system to be automatically maneuvered to the indicated position, comprising instructing one or more motorized pulley systems to move a line coupled to the underwater sensor system; and after reaching the indicated position, causing, by the one or more processing devices, the underwater sensor system to perform the indicated measurement.

In some implementations, the one or more processing devices are configured to adjust the position of the underwater sensor system using closed-loop feedback to adjust the operation of the one or more motorized pulley systems.

In some implementations, obtaining the data includes obtaining a position for the underwater sensor system based on output of a machine learning model, a set of scheduled movements, or one or more rules to adjust the position of the underwater sensor system based on aquatic conditions sensed by the underwater sensor system.

In some implementations, obtaining the data indicating the position and measurement to be performed comprises receiving a command; wherein the method comprises comprising verifying that the command can be validly executed based on the received data indicating parameters of the movable underwater sensor system; and wherein causing the underwater sensor system to be automatically maneuvered to the indicated position is performed based on verifying that the command can be validly executed.

In some implementations, causing the underwater sensor system to be automatically maneuvered to the indicated position is performed based on depth measurements determined based on input from an absolute pressure sensor, a sonar sensor, a laser range finder, a water temperature sensor, or an ambient light level sensor.

In some implementations, causing the underwater sensor system to be automatically maneuvered to the indicated position is performed based on distance measurements with respect to an element of an aquatic structure in which the sensor system resides based on input from a sonar sensor, a laser range finder, or 3-D reconstruction from images from a stereo camera system.

In some implementations, causing the underwater sensor system to be automatically maneuvered to the indicated position is performed based on line tension measurements determined based on input from a load cell, a motor torque sensor, a motor current sensor.

In some implementations, causing the underwater sensor system to be automatically maneuvered to the indicated position is performed based on line length estimates determined based on (i) a rotational position of motors determined using an encoder, resolver, or hall effect sensor, (ii) an angular position sensor, or (iii) a mechanism for measuring active diameter of spools as line is fed in and out.

In some implementations, causing the underwater sensor system to be automatically maneuvered to the indicated position comprises instructing at least two motorized pulley systems to each perform an adjustment that maneuvers the underwater sensor system.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
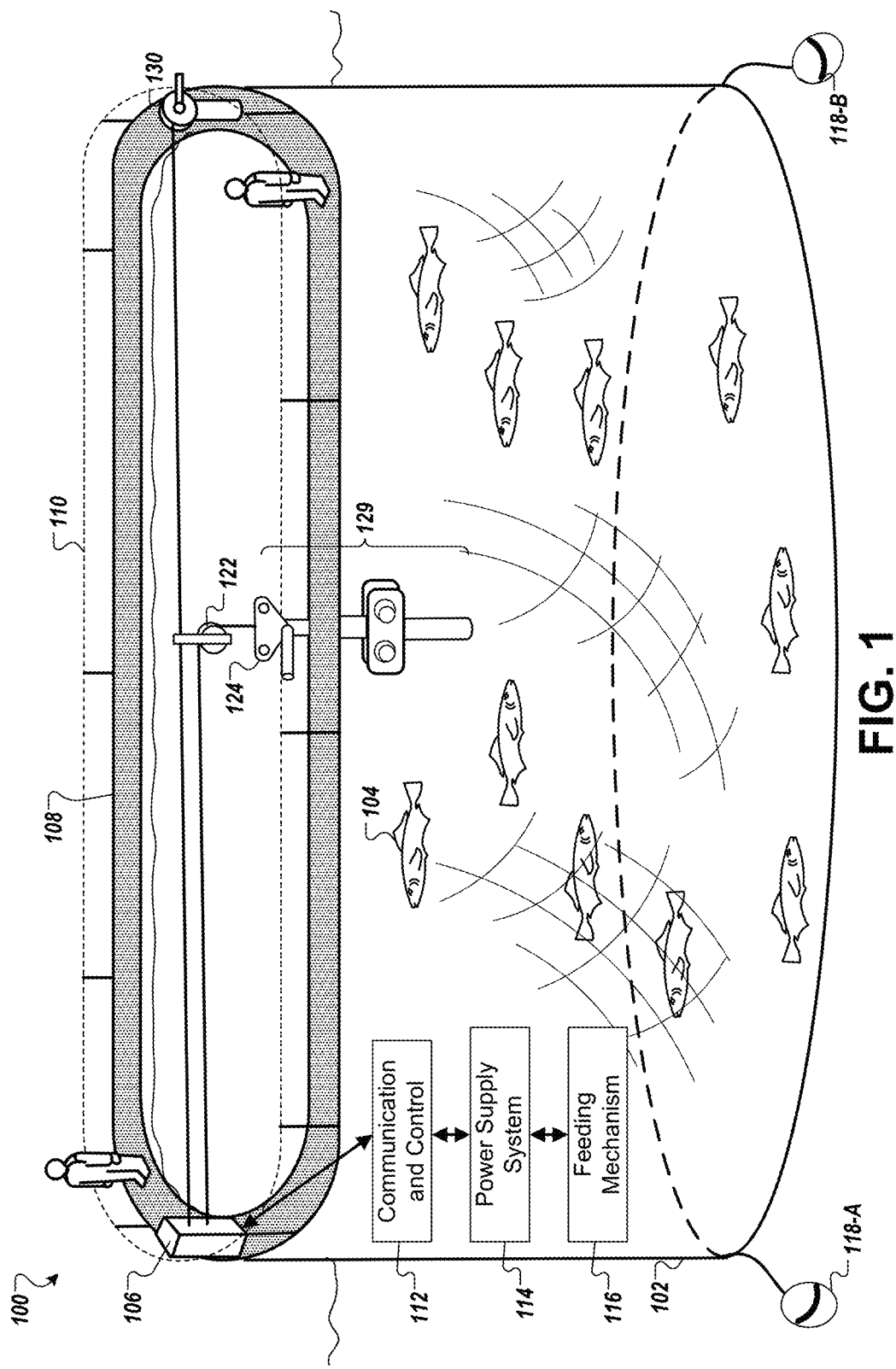
FIG. 1 is a diagram of an example configuration of a system of an aquaculture submersible structure that contains aquatic cargo.

FIG. 1 is a diagram of an example configuration of a system 100 of an aquaculture submersible structure 102 that contains live aquatic cargo 104. In this example, the structure 102 is an off-shore cage that contains live fish. The structure 102 is configured to maintain and store the aquatic cargo 104 in the open ocean and allow the cargo 104 to move freely and be monitored. In this particular example, the structure 102 is configured to be located in the open ocean at a desired location and allow the aquatic cargo 104, such as salmon, to pass freely through an exoskeleton of the structure 102. In particular, the exoskeleton of the structure 102 can be a net material. The net material can include holes that are large enough to allow the aquatic cargo 104 to pass through, or small enough so no aquatic cargo 104 can pass, and only water from the open ocean flows through the structure 102.

In some implementations, the structure 102 allows for one or more individuals external to the structure to view and analyze the live aquatic cargo 104. The individuals can walk along a catwalk 108 that is situated atop of the structure 102. The catwalk 108 can traverse the circumference of the structure 102 and can be wide enough so that multiple individuals can walk across the catwalk. The catwalk can also include a hole large enough for devices to enter the internals of the structure 102. A fence 110 sits atop the catwalk 108 to protect individuals from debris. In some implementations, the fence 110 can sit on the inner ring of the catwalk 108 to ensure no individual falls within the structure 102. The winch actuation system, as further described below, can sit on top of or rest adjacent to the fence 110 when the fence 110 is on the interior of the catwalk 108.

FIG. 1 illustrates a side view of the structure 102. The structure 102 includes live aquatic cargo 104, a communication and control system 112, a power supply system 114, a feeding mechanism 116 and a sensor positioning system 106.

The structure 102 is a free-floating structure located in the open ocean configured to contain and allow users to monitor aquatic cargo 104. Two underwater buoys 118-A and 118-B (collectively, underwater buoys 118) support the structure 102. In some implementations, the two underwater buoys 118 can be anchored to the ocean floor. In other implementations, the two underwater buoys 118 can be floating devices that allow the structure 102 to drift with the ocean current.

In some implementations, the aquatic cargo 104 stored within the structure 102 can include finfish or other aquatic lifeforms. The cargo 104 can include for example, juvenile fish, koi fish, sharks, and bass, to name a few examples. In one example, the cargo 104 is a juvenile fish and an individual can monitor the life maturity of the juvenile fish within the structure 102. In some implementations, the cargo 104 can be other resources, such as fresh water, relief aid, etc.

In some implementations, the structure 102 has an exoskeleton covered by a mesh netting. The mesh netting covering the exoskeleton of the structure 102 can have holes sized based on the cargo 104 contained within the structure 102. For example, if the average size of a homogenous cargo 104 is 12 centimeters (cm) in diameter, the holes of the mesh netting can be 10 cm in diameter to prevent the cargo 104 from exiting the structure 102. In some implementations, the mesh netting covering the exoskeleton of the structure 102 is made from material that can withstand strong ocean currents, such as iron, steel, etc. In some implementations, the structure 102 does not include mesh netting, but is environmentally sealed to protect the cargo 104 from ocean water. In this instance, a user can view the cargo 104 from outside the structure 102 by looking through the structure 102 or by looking down through the catwalk 108. The outside structure of the structure 102 can be a translucent material or a fully transparent material.

In some implementations, the structure 102 encompasses a volume of approximately 5,000,000 ft$^3$. For example, the structure 102 can have a diameter between fifty and seventy meters. In some implementations, the structure 102 encompasses a different volume, such as 2,500 ft$^3$, 4,000 ft$^3$, 6,000 ft$^3$, etc., and can have a different diameter, such as twenty feet, forty feet, sixty feet, etc. In some implementations, the structure 102 can be a cylindrical shape, such as the shape shown in system 100. In other implementations, the structure 102 can be a spherical shape. The cylindrical shape can include a sealable opening at the top within the catwalk 108 and an opening at the bottom of the structure 102 to allow cargo 104 to be inserted and released.

The structure 102 further includes one or more sensitive components. These sensitive components can be above water level or below the water level (as illustrated in system 100). In particular, the sensitive components can include the communication and control system 112, the power supply system 114, and the feeding mechanism 116. The sensitive components can be a sealed off component from the remainder of the structure 102. The communication and control system 112 can include sensors and electronics sensitive to water damage, and must be kept dry to function. The feeding mechanism 116 can include a feed bin that contains feed for the cargo 104.

The communication and control system 112 can include sensors such as sonar, cameras, depth sensors, pressure sensors, ocean current sensors, water quality sensors like oxygen saturation, total dissolved solids, and sounds using a hydrophone and current measurements integrated into the camera etc. that detect objects or acquire images for image analysis by the communication and control system 112 or a remote server. For example, the communication and control system 112 can include a camera that monitors the activity of the cargo 104 within the structure 102. In some implementations, the camera can move within the structure 102 to monitor the activity of the cargo 104.

In some implementations, the communication and control system 112 can monitor the position of the camera within the structure 102. A remote server may instruct the communication and control system 112 to move the camera to a particular location having a particular depth within the structure 102. The movement of the camera can be in real-time or can be based on a predetermined path within the structure 102 provided by the remote server.

In some implementations, the structure 102 can include a sensor positioning system. The sensor positioning system can include a sensor positioning system 106, a far side pulley 130, a near side pulley 122, an attachment bracket 124, and an imaging system 129. The sensor positioning system 106 connects to the far side pulley 130 with ropes or cable wires. Additionally, the sensor positioning system 106 connects to the attachment bracket 124 through the near side pulley 122 with ropes or cable wires. The sensor positioning system 106 moves the ropes or cable wires to control the movement of the imaging system 129. In other implementations, the imaging system 129 can move along one or more horizontal and vertical rails that can encompass the structure 102. In other implementations, the imaging system 129 can maneuver around the exterior of the structure 102 to monitor the activity of the cargo 104. In some implementations, instead of an imaging system 129 connected to the frame 126, the sensor positioning sensor system can include one or more other sensors, such as a camera system, a stereo camera system, a water quality sensor, or a hydrophone, or a combination of the above, to name a few examples.

Figure 2:
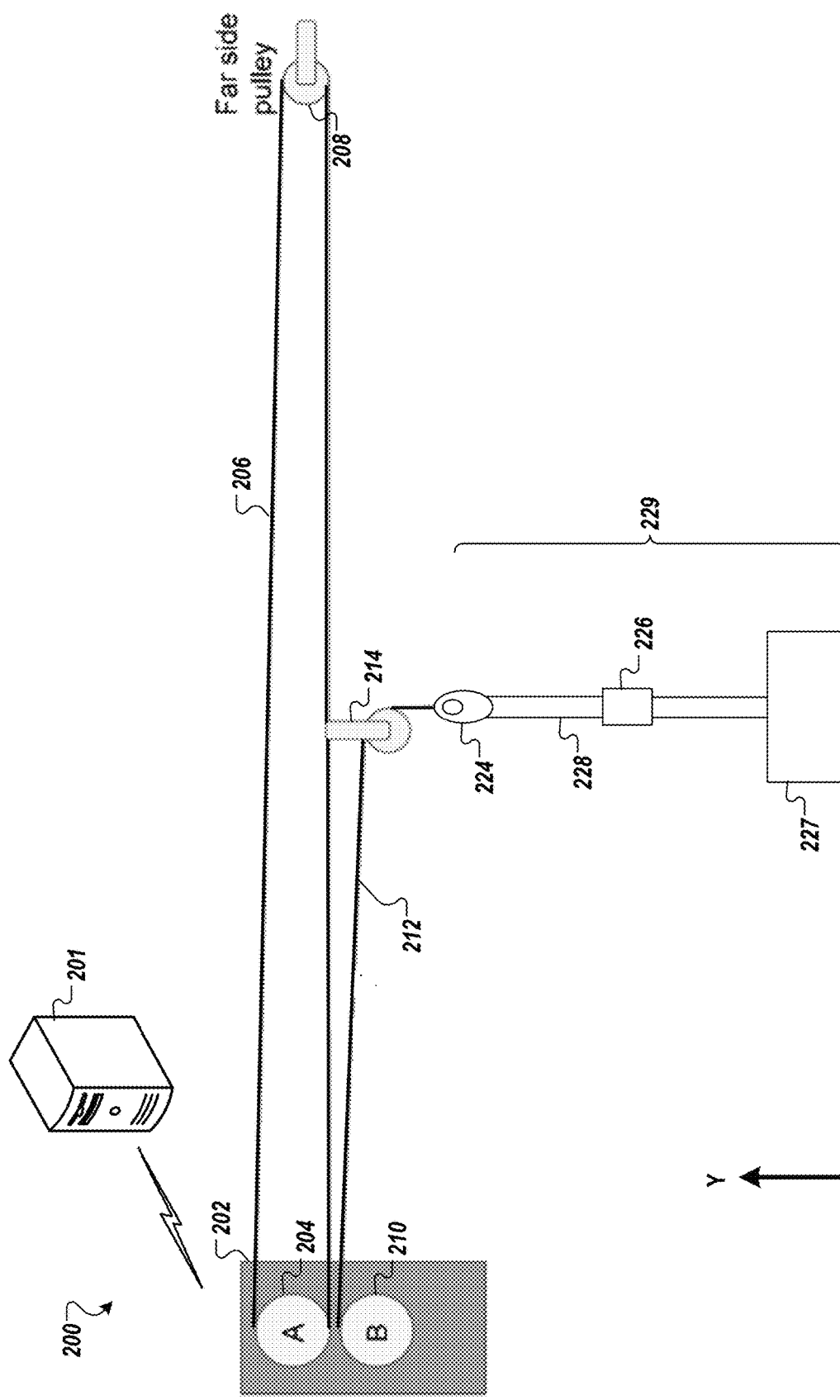
FIG. 2 is a diagram that illustrates an example configuration of a sensor positioning system for monitoring aquatic cargo.

FIG. 2 is a diagram that illustrates an example configuration of a sensor positioning system 200 for monitoring aquatic cargo. The sensor positioning system 200 can include an actuation server 201, a winch actuation system 202, a clothesline rope 206, a far side pulley 208, a pulley 214, and a sensor system 229. In other implementations, the sensor positioning system 200 can include a rope 206 instead of a rope. FIG. 2 also illustrates an X-Y-Z axes to illustrate various planes of the system 200.

The winch actuation system 202 can include a pulley system A 204, a pulley system B 210, one or more electric motors, a power supply, a transceiver, and a control module. The control module instructs the various components of the winch actuation system 202 to perform particular tasks. For example, the control module instructs an electric motor to rotate a corresponding pulley system A 204 at a rotational speed in a direction for a period of time.

The pulley system A 204 and pulley system B 210 can be, for example, a pulley or a spool. The far side pulley 208 can also be, for example, a pulley or a spool. A pulley is a simple machine used to support movement and direction of a rope, such as clothesline rope 206. A spool is a device that winds a rope, such as clothesline rope 206. In some implementations, the clothesline rope 206 can initially be spooled on the pulley system A and pulley system B in either direction (e.g., top or bottom). For example, the clothesline rope 206 can be feeding off the top of the pulley system A 204 and the bottom of the pulley system B 210.

The pulley system A 204 and pulley system B 210 can be, for example, grooved or flat. As illustrated in system 200, pulley system A 204 is a pulley for moving the clothesline rope 206 in different directions while the pulley system B 210 is a spool for depth rope 212. For example, as illustrated in the sensor positioning system 200, pulley system A 204 is used to support the movement and change of horizontal direction of the pulley 214 along the clothesline rope 206. The pulley system B 210 includes a spool of depth rope 212 that controls the movement of the depth rope 212 that, consequently, controls the vertical depth position of the sensor system 229 through a pulley 214. The winch actuation system 202's electric motors receive power from the power supply and can move both pulley system A 204 and pulley system B 210 in a desired direction at a particular speed.

The power supply powers the individual components of the winch actuation system 202. The power supply can provide AC and DC power to each of the components at varying voltage and current levels. For example, the power supply can supply 12 volts DC to the electric motors and 9 volts AC to the control module.

The transceiver can communicate in a bidirectional manner with the actuation server 201. The actuation server 201 can include a client device, a portable personal computer, a smart phone, and a desktop computer, to name a few examples. The actuation server 201 can be connected across the internet or can be one or more computers connected locally. For example, the transceiver can receive a notification from actuation server 201 to rotate pulley system A 204 clockwise at 10 RPM and pulley system B 210 counter-clockwise at 5 RPM for 5 seconds. In response to the time elapsing, the transceiver can transmit a notification to the actuation server 201 after the pulley system A 204 and pulley system B 210 have moved to their desired locations. In some implementations, the actuation server 201 can transmit a notification to the transceiver indicating the pulley system A 204 and pulley system B 210 should stop rotating.

Alternatively, the transceiver can transmit data to the actuation server 201. For example, the data can include a transmission of live video feed from the one or more cameras of the sensor system 216, pre-recorded media from the one or more cameras of the sensor system 216, sensor data from the communication and control system 112, and power supply information from the power supply system 114. Additionally, the data can include thermal imaging data from sensors from the sensor system 229, data from pressure sensors that can indicate a strength of ocean current moving through the structure 102, data from a water quality sensor, and data from a hydrophone.

The sensor positioning system 200 can be used to monitor aquatic cargo, such as fish and other aquatic animals, within the structure, such as structure 102. In some implementations, the winch actuation system 202 and the far side pulley 208 can be placed atop a platform along the perimeter of the structure 102. For example, the platform can be a catwalk, such as catwalk 108, or a horizontal sidewall connected to the structure 102 allowing one or more users to walk around the structure 102. While a portion of the structure 102 is exposed above water, the clothesline rope 206 can traverse between the pulley system A 204 of winch actuation system 202 and the far side pulley 208 from the platform through the structure 102. Separately, the depth rope 212 can traverse between the pulley system B 210, the pulley 214, and the sensor system 216 through the mesh netting of the structure 102. The interior of the structure 102 includes the pulley 214, the sensor system 216, the portion of the depth rope 212 from the pulley system B 210 to the sensor system 216, and the portion of the clothesline rope 206 between the pulley system A 204 and the far side pulley 208. The pulley 214 and the sensor system 216 can move horizontally along the clothesline rope 206 between the pulley system A 204 and the far side pulley 208 in the structure 102. Additionally, the sensor system 229 can move vertically along the depth rope 212 through the pulley 214 in the structure 102.

The sensor system 229 can move to a desired location within the structure 102. The movements can include horizontal movement and vertical depth movement within the structure 102. For example, the sensor system 229 can move to a location as described by an X-Y coordinate plane within the structure 102, such as 10 feet in the horizontal direction (X) along the clothesline rope 206 and 20 feet below sea level in the vertical direction (Y). The sensor system 229 can also move between the portion of the structure 102 exposed above sea level and the portion of the structure 102 that is beneath the sea level.

In some implementations, the electric motors of pulley system A 204 and pulley system B 210 can rotate independently of one another. In other implementations, as the pulley system A 204 rotates, the pulley system B 210 rotates. Similarly, as the pulley system B 210 rotates, the pulley system A rotates. For example, the actuation server 201 can transmit a notification to the winch actuation system 202 that instructs movement of pulley system A 204 and not requiring movement of pulley system B 210. The transceiver provides these received instructions to the control module, and the control module instructs the electric motors to rotate pulley system A 204 at 50 RPM in the clockwise direction for 10 seconds. By rotating the pulley system A 204 in the clockwise direction, the pulley 214 rotates and the sensor system 229 move in a desired distance in the horizontal direction towards the winch actuation system 202.

In another example, the actuation server 201 can transmit a notification to the winch actuation system 202 that instructs movement of pulley system B 210, not requiring movement of pulley system A 204. The transceiver provides these received instructions to the control module, and the control module instructs the electric motors to rotate pulley system B 210 at 10 RPM in the clockwise direction for 5 seconds. By rotating the pulley system A 204 in the clockwise direction, the pulley 214 remains stationary and the sensor system 229 moves a desired vertical distance downwards towards the bottom of the structure 102.

The far side pulley 208 provides stabilization for the clothesline rope 206. As the pulley system A 204 rotates, the clothesline rope 206 traverses around the far side pulley 208. For example, if the pulley system A 204 rotates in the clockwise direction, the clothesline rope 206 will rotate around the far side pulley 208 in the clockwise direction. Likewise, if the pulley system A 204 rotates in the counter-clockwise direction, the clothesline rope 206 will rotate around the far side pulley 208 in the counter-clockwise direction.

The pulley 214 provides stabilization and depth movement for the depth rope 212. The pulley 214 connects to the pulley system B 210 for depth movement of the sensor system 229. As illustrated in system 200, pulley system B 210 is a spool for depth rope 212. As the electric motors rotate pulley system B 210 in the clockwise direction, depth rope 212 is extended to increase the depth of the sensor system 229. As the electric motors rotate pulley system B 210 in the counter-clockwise direction, depth rope 212 is retracted into the pulley system B 210 where depth rope 212 is spooled.

The sensor system 229 includes a single point attachment bracket 224, a control system 226, an imaging system 227, and a frame 228. The control system 226 includes one or more components for moving the sensor system 229. For example, the control system 226 can include a panning motor that allows for rotation of the sensor system 229 about the Y-axis. Additionally, the sensor system 229 can move in horizontal and vertical directions.

The sensor system 229 is waterproof and can withstand the effects of external forces, such as ocean current, without breaking. For example, the imaging system 227 can be a stereo camera, a 3-D camera, or an action camera, or a combination of these cameras. In other implementations, the sensor system 229 can include one or more other sensor types in place of the imaging system 227. In particular, the sensor system 229 can include pressure sensors, a hydrophone, a water quality sensor, a stereo camera system, a camera system, an HD camera system, ultrasound sensors, thermal sensors, or x-ray sensors, to name a few examples. The sensor system 229 can also include a combination of cameras and other various types of sensors, as previously mentioned The single point attachment bracket 224 includes a bracket or hanger connecting the depth rope 212 to the frame 228. The single point attachment bracket 224 can carry the weight of the other components of the sensor system 229. In some implementations, the single point attachment bracket 224 can adjust its position to account for the effects of external forces to not break.

In some implementations, the control system 226 controls the functionality of the imaging system 227. For example, the control system 226 includes the panning motor 220 that controls the movement of the imaging system 227. In some implementations, the panning motor can receive instructions from the actuation server 201 to move the imaging system 227. In other implementations, the panning motor receives instructions from the winch actuation system 202 to move the imaging system 227. The panning motor can move the imaging system 227 by adjusting the pan and tilt angle of the imaging system 227. For example, the panning motor can adjust the imaging system 227's pan angle from 60 degrees to −60 degrees along the X-axis. Similarly, the panning motor can adjust the imaging system 227's tilt angle from 45 degrees to −45 degrees along the Z-axis. In some implementations, the panning motor can rotate imaging system 227 about the Z-axis of the frame 228. The imaging system 227 can connect to the frame 228 with one or connections. The connections can include a bracket, or one or more fastening ropes tied in various knots, such as a rolling hitch, a bowline knot, or a half hitch knot, or a combination of the above. For example, the panning motor can rotate the imaging system 227 360 degrees about the Z-axis of the frame 228.

The control system 226 additionally stores the data captured by the imaging system 227 (e.g., the cameras and/or the sensors within the imaging system 227). In some implementations, the control system 226 can store media, such as, video and images received from the imaging system 227 as well as sensor data, such as ultrasound data, thermal data, and pressure data, to name a few examples. Additionally, the control system 226 can include a GPS positional module to capture the positional information of the control system 226. The control system 226 can transmit the captured media with GPS positional information of the sensor system 229 to the actuation server 201. By providing the GPS positional information with the captured data to the actuation server 201, a user viewing the data at the actuation server 201 can determine a location of the sensor system 229 while the sensor system 229 captures data of aquatic cargo in the structure 102, such as capturing media of the aquatic cargo. The control system 226 can also include one or more devices that emit light, sound, or otherwise interact with the environment and the aquatic cargo. Additionally, the control system 226 can include inertial measurement devices for tracking motion and determining portion of the sensor system 229, such as accelerometers, gyroscopes, and magnetometers. The winch actuation system 202 can also keep track of the amount of line that has been spooled out (and reeled in) to provide another input for estimating position of the sensor system 229.

Additionally, the sensor system 229 can transmit the stored data to the actuation server 201 for imaging system 227 feedback. For example, the imaging system 227 may be capturing media of a school of fish in the structure 102. The sensor system 229 can provide the captured media to the actuation server 201 for a user's review (or operator's review) in real time. The user may want to move the sensor system 229 to a different position in the structure 102 for capturing media of the school of fish and as such, can adjust the positions of the pulley system A 204 and the pulley system B 210 to move the sensor system 229 to a desired location. Additionally, the user can instruct the panning motor to rotate the imaging system 227 to 256 degrees, for example, about the Z-axis of the frame 228 and 10 degrees about the X-axis of the frame 228 to capture the fish at a particular angle. Additionally, the user may have to use visual reference clues (e.g., the position of the feeding mechanism 116 when viewed from below the camera) to figure out a position of the sensor system 229 in the pen to determine where the feed of the feeding mechanism 116 is being delivered.

Figure 3:
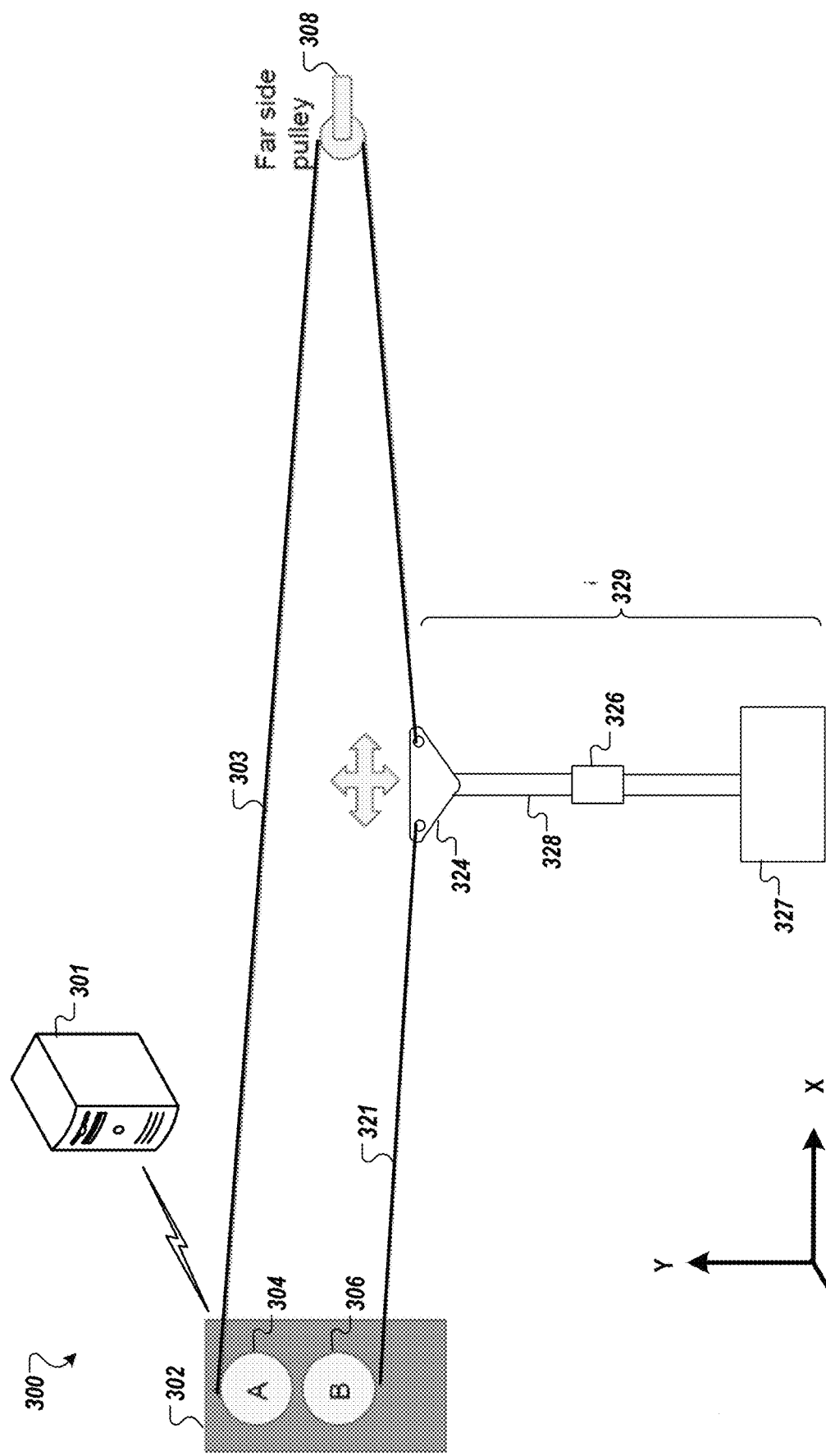
FIG. 3 is another diagram that illustrates an example configuration of a sensor positioning system for monitoring aquatic cargo.

FIG. 3 is another diagram that illustrates an example configuration of a sensor positioning system 300 for monitoring aquatic cargo. The sensor positioning system 300 has similar components and performs similar functions to the sensor positioning system 200. The sensor positioning system 300 can include an actuation server 301, a winch actuation system 302, a rope/line 303, a far side pulley 308, and a sensor system 329. FIG. 3 also illustrates an X-Y-Z axes to illustrate various planes of the system 300.

The winch actuation system 302 is similar to the winch actuation system 202. The winch actuation system 302 includes a pulley system A 304 and pulley system B 306. As illustrated in system 300, the pulley system A 304 includes a spool and the pulley system B 306 includes a spool. The rope 303 connects the pulley system A 304 to the sensor system 310 by traversing through the far side pulley 308. The rope 321 connects the pulley system B 306 to the sensor system 329. Together with the dual point attachment bracket 324, the ropes 303 and 321 provide movement, support, and stabilization for the sensor system 329. In some implementations, the rope 303 can initially be spooled on the pulley system A 304 and the pulley system B 306 in either direction (e.g., top or bottom). For example, the rope 303 can be feeding off the top of the pulley system A 304 and the bottom of the pulley system B 306.

The sensor system 329 includes similar components to the sensor system 229. However, the sensor system 329 includes a dual point attachment bracket 324 instead of a single point attachment bracket 224 used in sensor system 229. The single point attachment bracket 224 and the depth rope 212 can result in significant settling time delays when repositioning the sensor system 229. For example, the single point attachment bracket 224 can create a pendulum effect with the sensor system 229. Additionally, the depth rope 212 connected to the sensor system 229 does not provide for stabilization of the sensor system 229 in the X-Y plane. For example, if there is an ocean current moving against the sensor system 229, the sensor system 229 will rotate about the pulley 214 (e.g., about the frame 228) until the hydrodynamic forces and restoring gravitational forces reach equilibrium. This has the undesirable effect of rotating the sensor system 229 about the Y-axis and translating the sensor system 229 in the X-Z plane.

Additionally, the single point attachment bracket 224 and the depth rope 212 do not provide for stabilization of the sensor system 229 to rotate about the Y-axis (as shown by the X-Y-Z axes). Depending on the geometry and weight distribution of the submerged sensor system 229, the angular position of the sensor system 229 about the Y-axis will align with a dominant ocean current direction and/or fluctuate randomly about the Y axis. In general, the random fluctuations would create an impossible task for imaging a particular area of the structure 102 without the use of additional positioning systems. Typically, in practice, this issue can be mitigated by enclosing the sensor system 229 in an enclosure mounted on a positioning platform such that the sensor system 229 can be rotated without affecting the hydrodynamic forces on the assembly. Additionally, if a user desired to rotate all of the other sensors, illumination devices, etc., they all would need to be put on a similar enclosed positioning platform.

Additionally, the clothesline rope 206 connected between the pulley system A 204 and the far side pulley 208 would require a tensioning system for adjusting to dimension changes between pulley system A 204 and the far side pulley 208 due to external forces. For example, external forces such as wind, ocean current, and temperature variations that affect the dimensions of the overall cage structure. In particular, the tensioning system would maintain adequate tension along the clothesline rope 206 such that the clothesline rope 206 can be moved without slipping by pulley system A 204.

The dual point attachment bracket 324 and the dual rope support, as illustrated by the two connected points along the rope 321 and 303, addresses each of these issues caused by the single point attachment bracket 224. In particular, the dual point attachment bracket 324 and the dual rope support of the sensor system 329 significantly limits the Y-axis rotational disturbances and X-Z translation of the sensor system 329 due to the opposing tension forces in the two rope connection points and the moment arm in the dual point attachment bracket 324. In particular, the dual point attachment bracket 324 and the dual rope support allows for more precise positioning in the X-Z plane of the sensor system 329 in the presence of varying external forces, such as wind and/or ocean currents.

Additionally, the dual point attachment bracket 324 and the dual rope support of the sensor system 329 provides for a stabilized interface against Y-axis rotations. Even without the use of the panning motor within the control system 326, the sensor system 329's rotational angle about the Y-axis would not fluctuate randomly with the movement of external forces, such as ocean current and/or wind. In order to actively maintain a rotational angle about the Y-axis, the panning motor can be added to rotate the sensor system 329. Additionally, the panning motor has the desirable effect of rotating all of the other sensors or illumination devices without having to place them within an enclosure.

As the overall structure support, such as structure 102, dimensions change (i.e., due to wind, ocean current, and temperature variations), the tension in the ropes is maintained by the weight of the submerged sensor system 329. Any positional changes of the sensor system 329 due to the structure movement could be compensated by letting rope in or out of the one or both of the pulley systems A and B.

In some implementations, external forces that may torque and rotate the sensor system 329 while capturing media of aquatic cargo may affect the sensor system 329. For example, wind and ocean currents may apply a torque to the sensor system 329 about the frame 328. However, by providing the dual point attachment bracket 324 on the rope 303 and 321, the sensor system 329 can resist the torque applied by these external forces, stabilize in its current position, and maintain capturing data (e.g., footage or other sensor data) of the aquatic cargo. This becomes beneficial when the sensor system 329 is capturing data, such as media and other sensor data, of the aquatic cargo in the structure 102. Should an external torque be applied to the sensor system 329 while the imaging system 327 captures footage of the fish, for example, without the connection of the dual point attachment bracket 324, the sensor system 329 may move where there are no fish to observe. In addition, depending upon the amount of torque and/or rotation applied to the sensor system 329, a user may have to manually adjust the position of the sensor system 329 within the structure 102. This can waste precious time in capturing aquatic cargo that rarely enter and exit the structure 102. Thus, by providing the dual point attachment bracket 324 to the sensor system 329, missed opportunities for capturing sensor data of aquatic cargo can be reduced.

In some implementations, the control system 226 is similar to the control system 326. The control system 326 can include one or more encoders that estimate a position of the sensor system 329 within the structure 102. In particular, the position can be in terms of GPS coordinates. The control system 326 can further include sensors that provide feedback control in response to external forces on the sensor system 329. The feedback control can be generated by control system 326 to reduce vibrations on the sensor system 329 caused by the external forces. For example, if the sensors that provide feedback control determine that the sensor system 329 is vibrating in an undulating fashion, then the sensor system 329 can tighten the dual point attachment bracket 324's grip on the rope 321 and 303. Alternatively, the control system 326 can reduce the tension in the dual point attachment bracket 324's grip in response to determining that the sensor system 329 is unable to move.

The winch actuation system 302 also allows the sensor system 329 to move in various directions. In some implementations, the winch actuation system 302 can move the sensor system 329 left and right along a plane parallel to the ropes 303 and 321. Additionally, the winch actuation system 302 can move the sensor up and down along a plane perpendicular to the rope 303. In some implementations, the electric motors of the winch actuation system 302 can rotate the pulley systems A 304 and B 306 with varying magnitudes of angular speeds and in independent directions. For example, an electric motor can rotate the corresponding pulley system A 304 counter-clockwise at 5 RPM while another electric motor can rotate the corresponding pulley system B 306 clockwise at 20 RPM.

In some implementations, the electric motors can rotate the pulley systems A 304 and B 306 with the same magnitude of angular speed in opposite directions. For example, an electric motor can rotate the corresponding pulley system A 304 clockwise at 50 RPM while another electric motor can rotate the corresponding pulley system B 306 counterclockwise at 50 RPM.

In one example of movement, in order for the winch actuation system 302 to move the sensor system 329 downwards in the structure 102, the electric motors of the pulley system A 304 and the pulley system B 306 let out rope 303 and 321, respectively, until the sensor system 329 reaches a desired depth. In doing so, the pulley system A 304 rotates in a clockwise direction while the pulley system B 306 rotates in a counter-clockwise direction. As the sensor system 329 moves downwards, the ropes 303 and 321 create a "V" shape with the sensor system 329 at the bottom point of the "V."

To move the sensor system 329 upwards, both of the electric motors of the pulley system A 304 and the pulley system B 306 reel in rope 303 until the sensor system 329 reaches a desired depth. Thus, the pulley system A 304 rotates in a counterclockwise direction while the pulley system B 306 rotates in a clockwise direction.

To move the sensor system 329 towards the far side pulley 308 (or to the right), the electric motor corresponding to the pulley system A 304 reels in rope 303 while the electric motor corresponding to the pulley system B 306 lets out rope 303. In doing so, the pulley system A 304 rotates in a counter-clockwise direction while the pulley system B 306 rotates in a counter-clockwise direction.

To move the sensor system 329 towards the winch actuation system 302 (or to the left), the electric motor corresponding to the pulley system A 304 lets out rope 303 while the electric motor corresponding to the pulley system B 306 reels in rope 303. In doing so, the pulley system A 304 rotates in a clockwise direction while the pulley system B 306 rotates in a clockwise direction.

In some implementations, the winch actuation system 302 reduces the tension in lines 303 (e.g., wires or cable) and 321 in response to determining the sensor system 329 is close to an edge of the structure 102. The winch actuation system 302 can compare the distance of the sensor system 329 to a location of the edge of the structure 102 to generate a resultant distance. The winch actuation system 302 can compare the resultant distance to a predetermined threshold to determine whether to reduce tension in lines 303 and 321. In response to determining the sensor system 329 is within the predetermined threshold, the winch actuation system 302 can reduce tensions in lines 303 and 321. Alternatively, the winch actuation system 302 does not reduce tension in lines 303 and 321. In particular, the winch actuation system 302 reduces the tension in lines 303 and 321 to avoid the sensor system 329 tearing a net of the structure 102. Reducing tension in lines 303 and 321 allows the sensor system 329 to sag away from the net of the structure 102.

In some implementations, the winch actuation system 302 can automate the movement of the sensor system 329 based on data provided by the sensor system 329. In particular, the winch actuation system 302 can control the angle of the sensors on the sensors system 329 relative to the aquatic cargo within the structure 102. For example, the winch actuation system 302 can set the angle of the sensor system 329 with respect to the Y-axis to monitor one or more fish in the structure 102. The sensor system 329 can record sensor data of the fish within the structure and provide the recorded sensor data back to the winch actuation system 302 or the actuation server 301. For example, the recorded data can be audio, pressure data, and media of the recorded fish within the structure 102. As the sensor system 329 monitors the fish's movement, the sensor system 329 can rotate its angle about the X, Y, or Z-axis as it tracks the fish to continuously monitor the fish. For example, the imaging system 327, the winch actuation system 302, or the actuation server 301 can perform object recognition on the recorded sensor data to track the fish's movement in the recorded data provided by the imaging system 327. Based on the object recognition data generated by the winch actuation system 302 or the actuation server 301, the winch actuation system can generate movement of its pulley system A 304 and pulley system B 306 to move the sensor system 329 to continue to track the fish. For example, the pulley system A 304 and pulley system B 306 can both rotate in the clockwise direction, based on object recognition data indicating that the fish is moving closer to the winch actuation system 302. As the imaging system 327 tracks the fishes movement across the recorded data, the imaging system 327 can rotate about its corresponding X-Y-Z axes, based on the fishes movement. Alternatively, the control system 326 can transmit a notification to the winch actuation system 302 to maneuver the pulley systems 304 and 306 to move the sensor system 329 to a desired location.

The imaging system 327 can also capture media of cargo in the structure 102 to determine a distance between the cargo and the imaging system 327. The imaging system 327 can capture the media, perform object recognition, and determine a distance to the cargo (e.g., fish) in the media. Alternatively, the imaging system 327 can transmit the captured media to the winch actuation system 302 or to the actuation server 301 to perform object recognition on the captured media and determine a distance to the object (e.g., fish). In response to determining a distance from the sensor system 310 to the position of the fish, the actuation server 301 or the winch actuation system 302 can maneuver the sensor system 329 to move closer or farther away from the cargo to record media of the cargo. Alternatively, the sensor system 329 can remain in its current location.

In some implementations, the winch actuation system 302 can operate on a schedule to sample the aquatic cargo in the structure 102. The schedule can indicate that the winch actuation system 302 is to position the sensor system 329 at different locations within the structure 102 at various times of the day. Additionally, the schedule can indicate that the winch actuation system 302 is to instruct the sensor system 329 to record sensor data at different times of the day in various locations or the same location in the structure 102. For example, at 10:00 AM, the winch actuation system 302 can maneuver the sensor system 329 to record sensor data at 10 feet below sea depth in the Y direction; at 12:00 PM, the winch actuation system 302 can maneuver the sensor system 329 to record sensor data at 20 feet below sea depth in the Y direction; and, at 3:00 PM, the winch actuation system 302 can maneuver the sensor system 329 to record sensor data at 30 feet below sea depth in the Y direction. The sensor system 329 can record sensor data for a predetermined period of time. Additionally, the sensor system 329 can perform object recognition to track the movement of the fish in the structure 102 during the scheduled recordings. Other times and locations can be utilized for the schedule. In some implementations, a user can set the schedule for the sensor system 329 to record sensor data. In some implementations, the actuation server 301 can learn where some aquatic cargo, such as fish, tend to congregate in the structure 102 at various times of the day. The actuation server 301 can learn of fish locations at various times of the day based on recorded media provided by the sensor system 329. In particular, the actuation server 301 can determine that fish tend to congregate by the feeding mechanism 116 in the morning and by the surface in the afternoon. Thus, in this example, the actuation server 301 can create a schedule that instructs the winch actuation system 302 to move the sensor system 329 to monitor the feeding mechanism 116 in the morning and to the water's surface in the afternoon.

Alternatively, the winch actuation system 302 can position the sensor system 329 within proximity to the feeding mechanism 116 to monitor fish feeding at the feeding mechanism 116. The feeding mechanism 116 may feed the fish in the structure 102 based on a set schedule. The winch actuation system 302 can automatically move the sensor system 329 to record sensor data within proximity to the feeding mechanism 116 based on the set schedule of the feed. In particular, the winch actuation system 302 can move the sensor system 329 with slow and precise movement to a particular location within proximity to the sensor system 329 without disturbing the fish feeding on the feeding mechanism 116. By not disturbing the fish feeding, the sensor system 329 can record sensor data of many fish in the structure 102.

With the various movements of the sensor system 329 by the winch actuation system 302 and the sensor system 329's inclusion of the dual point attachment bracket 324, the sensor system 329 can move to a desired location (e.g., a desired depth and desired distance along the rope 303) in the pen and resist torque and rotations from external forces. For example, torque can be caused by external forces of water current, motion of the structure 102, motion of the structure 102 due to wind or user movement, and fish bumping into the sensor system 329. The dual point attachment bracket 324 can resist external torque and any additional movement to remain stabilized in the desired location while recording sensor data of aquatic life in the structure 102.

In some implementations, a user can clean each of the components within the system 300 to avoid rusting. A user can clean each of the components, such as cameras, ropes/suspensions, cables, winch, and pulleys, using fresh water to remove the salt from the ocean water. Additionally, a user can perform maintenance on the lines within structure 102 to determine if the knots of the ropes or cables need to be tightened or loosened. Other maintenance on the system can be performed to ensure the structure 102 performs as desired.

Figure 4:
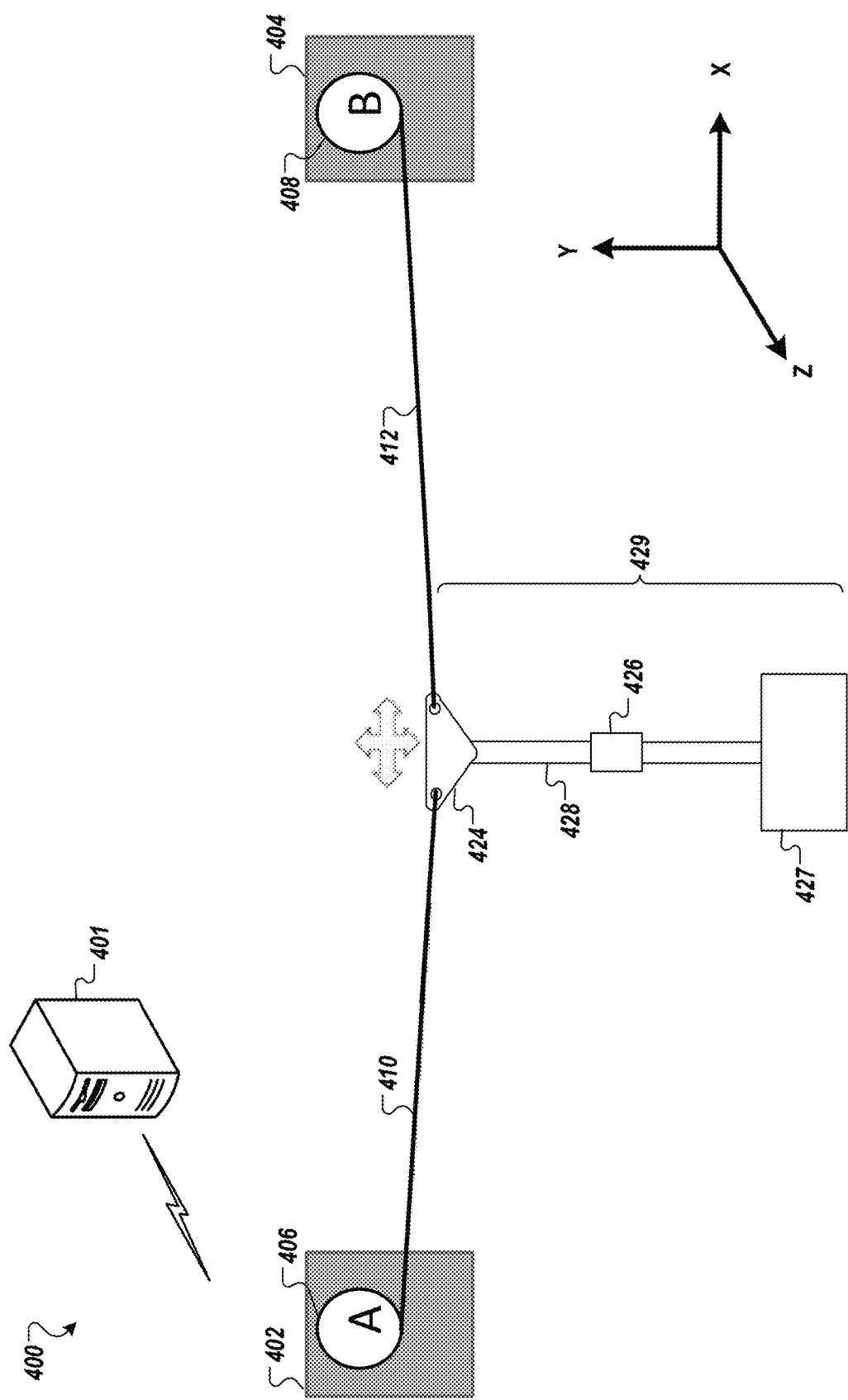
FIG. 4 is another diagram that illustrates an example configuration of a sensor positioning system for monitoring aquatic cargo.

FIG. 4 is another diagram that illustrates an example configuration of a sensor positioning system 400 for monitoring aquatic cargo. The sensor positioning system 400 has similar components to the sensor positioning systems 200 and 300. The sensor positioning system 400 also performs similar functions to sensor positioning system 200 and 300.

The sensor positioning system 400 can include an actuation server 401, a first actuation system 402, a second actuation system 404, a first line 410, a second line 412, and a sensor system 429. FIG. 4 also illustrates an X-Y-Z axes to illustrate various planes of the system 400.

The first actuation system 402 includes a spool 406 and the second actuation system 404 includes a spool 408. In some implementations, the first actuation system 402 includes a pulley 406 instead of a spool and the second actuation system 404 includes a pulley 408 instead of a spool. The first actuation system 402 connects to a dual point attachment bracket 424 through the first line 410. The first line 410 and the second line 412 can be a rope or cable. Additionally, the second actuation system 404 connects to a dual point attachment bracket 424 through the second line 412. In particular, the first line 410 connects between the spool 406 and the dual point attachment bracket 424 and the second line 412 connects between the spool 408 and the dual point attachment bracket 424. Together with the dual point attachment bracket 424 and the first actuation system 402 and the second actuation system 404, the ropes 410 and 412 provide movement, support, and stabilization for the sensor system 429.

The sensor system 429 includes similar components to the sensor system 329 and 229. The sensor system 429 also moves and can resist external forces in a similar manner compared to the sensor system 329. Sensor system 429 can additionally move in directions as desired by a user.

Both the first actuation system 402 and the second actuation system 404 allow the sensor system 429 to move in various directions within the structure 102. In some implementations, both actuation systems 402 and 404 can move the sensor system 429 along planes parallel to the X, Y, and Z-axes. Additionally, both actuation systems 402 and 404 can move the sensor system 429 in other directions within the X-Y-Z axes. The electric motors corresponding to the first actuation system 402 and the electric motors corresponding to the second actuation system 404 can rotate spools 406 and 408, respectively, with varying magnitudes of angular speeds and in independent directions. For example, an electric motor in the first actuation system 402 can rotate the corresponding spool 406 clockwise at 2 RPM while the electric motor in the second actuation system 404 can rotate the corresponding spool 408 clockwise at 2 RPM. In response to this particular movement by the spools 406 and 408, the sensor system 429 can move towards the first actuation system 402.

In some implementations, the sensor system 429 can be supported by the buoyancy weight of the ocean water. As the first actuation system 402 and the second actuation system 404 moves the sensor system 429, the sensor system 429 can move in a desired direction. In some implementations, the actuation server 401 can transmit a notification to the first actuation system 402 and to the second actuation system 404 to move corresponding spools 406 and 408. In particular, the actuation server 401 can transmit movement and directional rotation commands to each actuation system to move the sensor system 429 to a desired position. In some implementations, the actuation server 401 can transmit a separate notification to each actuation system to move its spool components. The actuation server 401 can also transmit stop commands to both actuation systems 402 and 404 to stop moving their corresponding spools.

System 400 does not have the support of a far side pulley, like in system 300. However, system 400 has a second actuation system 404 in place of the far side pulley. In one example, in order for the sensor system 429 to move downwards, the electric motors corresponding to the spool 406 and the spool 408 let out line 410 and 412, respectively, until the sensor system 429 reaches a desired depth. In doing so, the spool 406 rotates in a counter-clockwise direction while the spool 408 rotates in a clockwise direction. In another example, in order for the sensor system 429 to move upwards, the electric motors corresponding to the spool 406 and the spool 408 pull in lines 410 and 412, respectively, until the sensor system 429 reaches a desired depth. Thus, the spool 406 rotates in a clockwise direction while the spool 408 rotates in a counter-clockwise direction. In another example, in order for the sensor system 429 to move towards the second actuation system 404, the electric motor corresponding to the spool 406 releases line 410 and the electric motor corresponding to the spool 408 pulls line 412 in towards the second actuation system 404. In doing so, the spool 406 rotates in a counter-clockwise direction and the spool 408 rotates in a counter-clockwise direction. In another example, in order for the sensor system 429 to move towards the first actuation system 402, the electric motor corresponding to the spool 406 pulls line 410 in towards the first actuation system 402 and the electric motor corresponding to the spool 408 lets line out. In doing so, the spool 406 rotates in a clockwise direction and the spool 408 rotates in a clockwise direction. In some implementations, the spools 406 and 408 can be wound in different directions (than the directions shown in system 400), which reverses the direction of each spool movement when moving the sensor system 416 to a desired location. For example, if line 410 and line 412 were wound on their respective spools to exit the top of spools 406 and 408 (rather than the bottom as shown in system 400), respectively, then in order for the sensor system 429 to move downwards, spool 406 would rotate in a clockwise direction while the spool 408 rotates in a counter-clockwise direction.

In some implementations, the actuation server 401 can transmit commands to the spools (e.g., 406 and 408) and to the sensor system 429 that instruct those components to move in a particular manner. The commands can be sent wirelessly over a network to the spools and wirelessly to the sensor system 429. For example, the commands can instruct spool 406 of the first actuation system 402 to rotate at a particular speed and in a particular direction to achieve a desired movement of the sensor system 429. Additionally, the commands can instruct spool 408 of the second actuation system 404 to rotate at a particular speed and in a particular direction to achieve a desired movement of the sensor system 429. The commands can indicate to the first and second actuation systems 402 and 404 to move the spools simultaneously, yet independently of one another. Alternatively, the commands can indicate to the first actuation system 402 to move its spool while the spool of the second actuation system 404 remains taunt, and vice versa. As discussed below, communication between the actuation server 401 or another control system and the actuation systems 402 and 404 can provide closed-loop control to automatically adjust the position of the sensor system 429 within the aquatic structure 102. The actuation server 401 or an associated system can store or predict positions and orientations to be used for capturing different types of data, allowing the system to automatically move the sensor system 429 through a series of measurements at different locations.

In some implementations, the system 400 can perform automated system control of the sensor system 429. For example, the first and second actuation systems 402 and 404, the sensor system 429, and the actuation server 401, can automatically monitor aquatic cargo in a closed loop system. The closed loop system allows each of the components of system 400 to communicate with one other to automatically monitor the aquatic cargo. The actuation server 401 can use context of each of the components of system 400, such as context of the first actuation system 402, the second actuation system 404, and the sensor system 429, to determine what movements to perform. The context can indicate a position for each of these components in the aquatic structure 102, a current rate of speed of the movable components (e.g., such as the spools 406 and 408, and the components of the sensor system 429), a current direction of the movable components (e.g., clockwise or counterclockwise) and data found in the media and/or sensor data from the control system 426.

The actuation server 401 can store a machine-learning model that can analyze a current context of the system 400 (as well as historical context of the system 400) to produce a position for the sensor system 429 to move to in the aquatic structure 102. The machine-learning model can be trained to produce the location based on the historical contextual data of the system 400 that allowed for optimal recordings of the aquatic cargo. For example, the actuation server 401 can record context data of the components of the system 400 when the highest density of aquatic cargo was recorded by the sensor system 429. In another example, the actuation server 401 can record context data when a particular type of aquatic cargo was recorded by the sensor system 429. The actuation server 401 can use additional context data to train the machine-learning model, such as, for example, time of day, type of food provided to the feeding mechanism 116 and subsequently, the type of fish found eating that type of food, locations of types of fish found in the aquatic structure 102, temperature of the ocean, and salinity of the ocean.

Once the machine-learning model is properly trained by the actuation server 401, the actuation server 401 can implement the machine-learning model in practice. For example, the actuation server 401 can retrieve current contextual data from the system 400 to produce a GPS location for a new position of the sensor system 429. From the produced GPS location, the actuation server 401 can analyze the current position (e.g., current GPS position) of the sensor system 429 within the aquatic structure 102 and generate the commands to move the sensor system 429 to the produced GPS location from the current GPS position. For example, the commands may include to rotate the spool 406 clockwise at 10 RPM for 5 seconds, rotate the spool 408 counterclockwise at 5 RPM for 5 seconds, and rotate the imaging system 427 about the Y-axis to 265 degrees from 0 degrees position. Other movement commands can be used. In other implementations, the actuation server 401 can retrieve current contextual data from the system 400 to produce a relative positioning system in addition to GPS positioning. For example, the relative positioning system may include positioning points relative to the aquatic structure 102 (e.g., 1 unit from the exoskeleton of the aquatic structure 102 or 10 units from the center of the aquatic structure 102). Additionally, the actuation server 401 may use the relative positioning system based on the dynamic structure of the aquatic structure 102. For example, the aquatic structure 102 may change its current shape, size, and absolute position during inclement weather and strong ocean currents.

Once the sensor system 429 has finished moving for the designated time, the sensor system 429 may begin recording media and/or sensor data of the aquatic cargo. Alternatively, the sensor system 429 may record media and/or sensor data as the sensor system 429 moves to the desired location. The actuation server 401 can store an indication in memory that the sensor system 429 completed the desired movement to the new position.

Once the sensor system 429 reaches the desired destination, the components of system 400 can operate in a feedback closed loop manner to monitor and track the aquatic cargo in the aquatic tank. For example, as the sensor system 429 records media and/or sensor data of the aquatic cargo, the control system 426 can transmit the recorded media and/or sensor data of the aquatic cargo to the actuation server 401. The actuation server 401 can perform facial and/or object recognition on the recorded media and/or sensor data to track movement of the aquatic cargo from the recorded media. If the actuation server 401 determines that the aquatic cargo is moving across the recorded media in a particular direction, then the actuation server 401, in real-time, can generate movement corresponding commands to move the sensor system 429 to track the aquatic cargo movement in the same particular direction. The actuation server 401 can transmit the commands to the first actuation system 402, to the second actuation system 404, and to the sensor system 429 to perform the desired movement. These systems have the ability to understand and execute these commands and additionally, perform course correction to move the sensor system 429 to the desired location provided by the commands. For example, the commands can include specific motor movement commands of the first and second actuation systems 402 and 404, which can include an amount of rope/line to be let out or pulled in; an amount of voltage/current to give to the motors of the first and second actuation systems and the sensor system 429. The components of the system 400 can thus automatically monitor the aquatic cargo using recognition techniques, positioning commands, and fine course movement in this feedback closed loop system.

In some implementations, the system 400 can perform fault prevention as a proactive strategy to identify potential areas where a fault may occur while monitoring the aquatic cargo in the aquatic tank and close the gaps of the potential areas. For example, the actuation server 401 can limit the amount of line tension when the sensor system 429 comes within proximity of the net of the aquatic tank or other objects found inside the aquatic tank. The actuation server 401 can monitor the recorded media to determine the proximity of the sensor system 429 to the net or one or more objects within the aquatic tank. If the actuation server 401 determines that the sensor system 429 is too close to these objects (e.g., within a threshold distance), the actuation server 401 can promptly transmit stop commands to both the first actuation system 402 and the second actuation system 404 to tighten the ropes/lines 410 and 412 to stop the movement of the sensor system 429. Additionally, the actuation server 401 can instruct the spools of the actuation system to pull the sensor system 429 away from the impending object to avoid impact.

Additionally, the actuation server 401 can instruct the sensor system 429 to be moved due to impending danger. For example, if a large fish, such as a shark or whale, enters the aquatic tank, the actuation server 401 can instruct the sensor system 429 to rise out of the water to avoid damage. A user may interact with the actuation server 401 to send a command to the components of system 400 to raise the sensor system 429 out of the water if the user recognizes a large fish entering the aquatic tank. Additionally, if the smaller fish start to attack the sensor system 429, the actuation server 401 can raise the sensor system 429 out of the water to avoid the attack.

In some implementations, the actuation server 401 can protect against improper spooling of the actuation systems 402 and 404 in the event of line tension being reduced or exceeding a threshold value. For example, the actuation server 401 can poll the first actuation system 402 and the second actuation system 404 to determine an amount of line that has been pulled in or let out. If the actuation server 401 receives an indication from either the actuation systems 402 and 404 that an amount of rope that has let out is greater than a threshold, such as 30 feet, for example, the actuation server 401 can transmit a message to the corresponding actuation system(s) to pull in the sensor system 429 to be below the threshold. Alternatively, if the actuation server 401 receives an indication that an amount of rope that has let out is less than a threshold, such as 2 feet, for example, the actuation server 401 can transmit another message to the corresponding actuation system(s) to let out the sensor system 429 to be above the threshold. Alternatively, the actuation server 401 can compare the amount of rope that has been let out by a corresponding actuation system to a threshold value. Thus, the actuation server 401 can protect the ropes of the system 400 from snapping or becoming too loose.

In some implementations, the actuation server 401 can rely on various components of the system 400 to perform measurements. For example, the actuation server 401 can rely on various components of the system 400 to perform depth measurements of the sensor system 429. Additionally, the actuation server 401 can perform distance measurements between various components in the system 400. Line tension measurements and line length estimates can also be performed by the actuation server 401 to ensure safety measures of the components in system 400.

In some implementations, the actuation server 401 can perform depth measurements of the sensor system 429. The actuation server 401 can receive data from the control system 426 that describes data retrieved from the sensors and cameras in the imaging system 427. For example, the imaging system 427 can include an absolute pressure sensor, a sonar sensor, a laser range finder, water temperature sensor, and ambient light sensors, among other sensors. The actuation server 401 can use the data from these sensors, such as the sonar sensor, to measure the distance from the sensor system 429 to the ocean surface. Additionally, data from the sonar sensor can be used to measure the distance from the sensor system 429 to the bottom of the aquatic structure 102. In conjunction with the data from the sonar sensor, the actuation server 401 can use data from the laser ranger finder and the absolute pressure sensor to determine the location of the sensor system 429. Additionally, based on the water temperature and the ambient light levels, the actuation server 401 can determine the depth of the sensor system 429. For example, the colder the water temperature and the darker the ambient light level, the lower the sensor system 429 is within the aquatic structure 102.

In some implementations, the actuation server 401 can perform distance measurements between the sensor system 429 and the other elements within the system 400. The actuation server 401 can receive data from the control system 426 that describes the sensors and cameras in the imaging system 427. For example, the imaging system 427 can include a sonar sensor, a laser range finder, and 3-D cameras. The imaging system 427 can provide this data to the actuation server 401 for processing to determine distance measurements. For example, the actuation server 401 can use the data from the sonar sensors, the data from the laser range finder, and the data from the camera images to determine the distance of the sensor system 429 to other objects within the aquatic structure 102. The actuation server 401 can reconstruct images from the stereo camera at the imaging system 427 using techniques, such as, for example, stereophotogrammetry. Stereophotogrammetry involves estimating three-dimensional coordinates of points of an object employing measurements made in two or more photographic images taken from different positions.

The actuation server 401 can also perform line tension measurements and line length estimates using various sensors in the actuation systems and the sensor system 429. The actuation systems and the sensor system 429 can include load cells, motor torque sensing, and motor current/voltage sensing. For example, the actuation server 401 can analyze the data from the load cells and data from the motors to determine a tension of line from the corresponding actuation system 402 and 404. Based on the amount of voltage and/or current provided to the motors, the actuation systems 402 and 404 can determine how far the spools have rotated which can translate to a tightness of line. Alternatively, the actuation server 401 can determine the tightness of the lines using the amount of voltage and/or current provided to the motors in the spools. The actuation systems 402 and 404 can transmit this information to the actuation server 401 when the actuation server 401 seeks to determine whether the line is too taunt or too lose. Additionally, the actuation server 401 can determine line length measurements that have been released from the actuation systems. For example, the first and second actuation systems 402 and 404 can provide the rotational position of its motors to the actuation server 401 to determine how much line has been let out.

The first and second actuation system 402 and 404 can use an encoder, a resolver, or a hall effect sensor connected to the motors of the spools to determine a position of the motors. Based on determining the position of the motors, the actuation systems 402 and 404 (e.g., or the actuation server 401) can determine the amount of line that has been released. In another example, the actuation systems 402 and 404 can use a mechanism, such as an angular position sensor, for measuring the active diameter of spools as line is fed in and out of the corresponding actuation system. The angular position sensor can continuously report the diameter of the spool to the actuation server 401 for monitoring an amount of line that has been released.

In some implementations, automatic positioning of the sensor system 429 can be achieved by receiving and carrying out inputs or commands that indicate waypoints, times, speeds, and/or positions for the sensor system 429. The actuation systems 402 and 404 and the control system 426 can then carry out received commands by, for example, progressively adjusting line to place the sensor system 429 in positions indicated by waypoints, making position adjustments at specified times, moving at specified speeds, and/or moving to specified positions within the aquatic structure 102. For example, these inputs or commands could be obtained from the actuation server 401 and/or the communication and control system 112. The actuation server 401 can be responsible for validating the inputs or commands, e.g., by verifying that the commands are valid and appropriate given the current system configuration and constraints (based on the inputs) of the sensor system 429. The actuation server 401 can then translate the command inputs into lower level commands, such as motor drive signals to drive the motors in the first and second actuation systems 402 and 404. Automated positioning can also specify positions or other configuration settings for the sensor system 429 itself, e.g., image capture settings, rotational position settings, and so on.

The actuation server 401 can also position its sensor system 429 according to a schedule set by a user. For example, the schedule can move the sensor system 429 to a set position within the aquatic tank and record for 10 minutes at 9:30 AM. The schedule can then move the sensor system 429 to another position within the aquatic tank and record for 15 minutes at 11:30 AM. Additionally, the sensor system 429 can also move to the feeding mechanism 116 at set times throughout the day based on the schedule. According to the types of food provided through the feeding mechanism 116, the feeding mechanism 116 will draw types of fish that can be recorded by the sensor system 429. A user can configure the schedule based on a desired movement of the sensor system 429.

In some implementations, the system 400 uses a model-based approach based on a data set including information about or conditions of the aquatic environment, such as water quality, water temperature, life cycle of the current aquatic cargo, season, tides, weather, etc. An automated positioning scheme can involve instructing the system to collect specified types of data, at a certain specified location, until conditions fall outside of predetermined thresholds. Then, the system is configured to automatically move the sensor system 429 to a different specified location and collect a predetermined set of data there. In this manner, the system 400 can automatically move the sensor system 420 according to detected conditions, continuing to move between locations and to change the types of measurements made according to whether the predetermined conditions are met. In a more general sense, thresholds may be replaced by machine-learning predictions derived based on a weighted estimate of the values of various types of data to collect at various locations. Based on past, current, and forecasted conditions of the aquatic environment, the system can predict which types of data need to be collected and which locations the data should be collected from.

In some implementations, the actuation server 401 can train its machine-learning model to position the sensor system 429 to various positions in the aquatic tank. The machine-learning model can be trained to position the sensor system 429 in rich areas of the ocean. The rich areas of the ocean can include areas where fish tend to congregate the most. For example, areas where fish tend to congregate can be based on a water quality, a water salinity level, a water temperature, a type of aquatic cargo, the season, and the tide of the ocean. The actuation server 401 can collect characteristic data of the ocean from the sensors in the sensor system 429 (e.g., in the imaging system 427) monitoring the ocean water. This data can be used by the actuation server 401 to train the machine-learning model to produce a location to place the sensor system 429. The actuation server 401 can instruct the sensor system 429 to monitor the ocean in positions of the aquatic tank 102 until the quality of the rich areas fall outside one or more thresholds. For example, if the water salinity level drops below a particular level, the water temperature changes below a particular level, or the tide of the ocean changes from low tide to high tide, to name a few examples, then the sensor system 429 can move to a different area within the aquatic tank 102 to acquire data from the ocean that falls within the ranges.

In some implementations, the machine-learning model could replace threshold values utilized by the system 400. The machine-learning model can use historical contextual data, current contextual data, and forecasted contextual data to generate predictions for the system 400. For example, instead of using a threshold to determine whether too much line has been released by the actuation systems 402 and 404 (or too little line has been released), the machine-learning model can be trained to predict situations of a likelihood of an amount of line to be released is greater than or less than the threshold. In another example, the machine-learning model can be used to produce depth and distance measurements.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. An underwater sensor system for monitoring aquatic cargo within an aquaculture system, the system comprising:
   a dual point attachment bracket that comprises only two points of attachment for attaching two lines to one or more pulleys of a winch system; and
   a panning motor coupled to the dual point attachment bracket, the panning motor configured to rotate a portion of the underwater sensor system relative to the dual point attachment bracket,
   wherein horizontal forces of the two attaching lines through the two points of attachment move the underwater sensor system horizontally when the horizontal forces are unequal or create a stabilized interface for the underwater sensor system about a vertical axis when the horizontal forces are equal, and wherein vertical forces of the two attaching lines through the two points of attachment move the underwater sensor system vertically underwater through the aquaculture system.

2. The system of claim 1, comprising an imaging system coupled to the panning motor, wherein the panning motor is configured to control a movement of the imaging system.

3. The system of claim 2, comprising a remote actuation server communicatively coupled to the panning motor, wherein the actuation server is configured to:
   receive sensor data from the underwater sensor system that illustrates aquatic cargo viewed from the underwater sensor system;
   generate object recognition data from the sensor data that indicates a location of the underwater sensor system to the aquatic cargo; and
   based on the generated object recognition data from the sensor data that indicates the location of the underwater sensor system to the aquatic cargo, transmit an instruction to the panning motor to move the imaging system.

4. The system of claim 2, comprising a frame coupling the dual point attachment bracket and the imaging system.

5. The system of claim 4, wherein the panning motor is configured to rotate the imaging system in a range of approximately 0 degrees to approximately 360 degrees about a Z-axis of the frame.

6. The system of claim 2, wherein the imaging system is rotatable about one or more of X, Z, and Y axes.

7. The system of claim 2, comprising a winch system comprising one or more pulley systems coupled to the dual attachment bracket, the winch system communicatively coupled to the panning motor and configured to send instructions to the panning motor to move the imaging system.

8. The system of claim 2, wherein the panning motor is configured to adjust a tilt angle in a range of approximately 45 degrees to approximately-45 degrees along a Z-axis of the panning motor.

9. The system of claim 2, wherein the panning motor is configured to adjust a pan angle in a range of approximately 60 degrees to approximately-60 degrees along an X-axis of the panning motor.

10. The system of claim 2, wherein the dual point attachment bracket forms an upper part of the underwater sensor system.

\* \* \* \* \*